(12) United States Patent
Thompson et al.

(10) Patent No.: US 10,329,460 B2
(45) Date of Patent: Jun. 25, 2019

(54) FAST CURING OPTICAL ADHESIVE

(71) Applicant: 3M INNOVATIVE PROPERTIES COMPANY, St. Paul, MN (US)

(72) Inventors: Wendy L. Thompson, Roseville, MN (US); Wayne S. Mahoney, St. Paul, MN (US); Donald K. Larson, Cedar Park, TX (US); Daniel J. Treadwell, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/696,901

(22) Filed: Sep. 6, 2017

(65) Prior Publication Data

US 2018/0072924 A1 Mar. 15, 2018

Related U.S. Application Data

(60) Provisional application No. 62/394,562, filed on Sep. 14, 2016, provisional application No. 62/541,864, filed on Aug. 7, 2017.

(51) Int. Cl.

| | | |
|---|---|---|
| *C08F 2/46* | (2006.01) | |
| *C08F 2/50* | (2006.01) | |
| *C08G 61/04* | (2006.01) | |
| *C09J 11/06* | (2006.01) | |
| *C09J 11/04* | (2006.01) | |
| *C09J 163/00* | (2006.01) | |
| *G02B 6/255* | (2006.01) | |
| *G02B 6/26* | (2006.01) | |
| *C08G 59/68* | (2006.01) | |
| *C08K 3/36* | (2006.01) | |
| *C08K 5/01* | (2006.01) | |
| *C08K 5/03* | (2006.01) | |
| *C08K 5/08* | (2006.01) | |

(52) U.S. Cl.
CPC .............. *C09J 11/06* (2013.01); *C08G 59/68* (2013.01); *C09J 11/04* (2013.01); *C09J 163/00* (2013.01); *G02B 6/255* (2013.01); *G02B 6/264* (2013.01); *C08K 3/36* (2013.01); *C08K 5/01* (2013.01); *C08K 5/03* (2013.01); *C08K 5/08* (2013.01)

(58) Field of Classification Search
CPC ........... C09J 11/06; C09J 163/00; C09J 11/04; G02B 6/255; G02B 6/264; C08K 5/03; C08K 3/36; C08K 5/08; C08K 5/01
USPC ................. 522/31, 6, 71, 189, 184, 1; 520/1
See application file for complete search history.

(56) References Cited

U.S. PATENT DOCUMENTS

| | | | |
|---|---|---|---|
| 4,279,717 A | 7/1981 | Eckberg et al. | |
| 4,735,632 A | 4/1988 | Oxman et al. | |
| 4,900,125 A | 2/1990 | Iyer | |
| 5,145,886 A | 9/1992 | Oxman et al. | |
| 5,545,676 A | 8/1996 | Palazzotto et al. | |
| 5,648,407 A | 7/1997 | Goetz et al. | |
| 5,753,346 A | 5/1998 | Leir et al. | |
| 5,998,495 A | 12/1999 | Oxman et al. | |
| 6,017,660 A | 1/2000 | Palazzotto et al. | |
| 6,025,406 A | 2/2000 | Oxman et al. | |
| 6,187,833 B1 | 2/2001 | Oxman et al. | |
| 6,187,836 B1 | 2/2001 | Oxman et al. | |
| 6,331,080 B1 | 12/2001 | Cole et al. | |
| 6,395,124 B1 | 5/2002 | Oxman et al. | |
| 6,620,907 B2 | 9/2003 | Mader | |
| 7,071,263 B2 | 7/2006 | Cheng et al. | |
| 7,491,287 B2 * | 2/2009 | Behr ................... | C08F 283/00 156/272.2 |
| 7,491,297 B2 | 2/2009 | Serr et al. | |
| 8,394,977 B2 | 3/2013 | Tiefenbruck et al. | |
| 8,871,853 B2 | 10/2014 | Thunhorst et al. | |
| 2004/0067450 A1 | 4/2004 | Leatherdale et al. | |
| 2004/0068023 A1 | 4/2004 | Leatherdale et al. | |
| 2004/0147029 A1 | 7/2004 | Adam | |
| 2007/0141524 A1 * | 6/2007 | Brennan ............. | A61C 7/16 433/9 |
| 2008/0306203 A1 | 12/2008 | Adam et al. | |
| 2010/0209701 A1 | 8/2010 | Kim et al. | |
| 2018/0067261 A1 | 3/2018 | Clatanoff et al. | |
| 2018/0067262 A1 | 3/2018 | Larson et al. | |

FOREIGN PATENT DOCUMENTS

| | | | |
|---|---|---|---|
| WO | WO 2003-059295 | 7/2003 | |
| WO | WO 2005-066672 | 7/2005 | |
| WO | WO-2005066672 A1 * | 7/2005 | ............ B82Y 20/00 |
| WO | WO 2007-146251 | 12/2007 | |
| WO | WO 2009-152296 | 12/2009 | |
| WO | WO 2017-015188 | 1/2017 | |
| WO | WO 2015-023640 | 4/2017 | |

OTHER PUBLICATIONS

International Search Report for PCT Application No. PCT/US2017/050255, dated Dec. 4, 2017, 4 pages.

* cited by examiner

*Primary Examiner* — Jessica Whiteley
(74) *Attorney, Agent, or Firm* — Jeffrey M. Olofson

(57) ABSTRACT

An adhesive composition for joining optical components is described. The adhesive composition comprises at least one epoxy resin, a visible light photoinitiating system comprising at least one of a cationic photoinitiator and a sensitizer, a polyol and at least 50 wt. % of a nanoparticle filler. The visible light photoinitiating system includes at least one of a cationic photoinitiator and a sensitizer and the nanoparticle filler comprises a first nanoparticle having a first nominal size and a second nanoparticle having a second size. The adhesive composition has a refractive index between 1.44 and 1.47 and a dn/dT of less than $-2E-4$ when cured.

23 Claims, No Drawings

FAST CURING OPTICAL ADHESIVE

FIELD OF THE INVENTION

The present invention relates to a blue light curing optical adhesive having a cure time less than 60 seconds. In particular, the exemplary optical adhesive can be used in the signal transmission path of an optical fiber network.

BACKGROUND OF THE INVENTION

As the world demand for data continues to increase, more data is transmitted optically through indoor/outdoor cables using optical fibers, to deliver fiber to the home (FTTH), within the data center, central office or enterprise environments, as well as in fiber fed backhaul applications for wireless transmission or fiber to the antenna (FTTA) applications. These applications demand low cost, reliable methods to join and terminate the ends of optical fiber cables.

In the situations where test access or reconfiguration is required, ferrule based connectors such as SC, LC, MT format optical fiber connectors will be used, due to their durable construction. On the other hand, permanent joints or splices are used to join optical fibers where the lowest optical loss is required. Conventional optical fiber splicing technologies include fusion splicing and mechanical splicing.

Fusion splicing utilizes an arc to fuse or melt the ends of two optical fibers together. The splicing machines are expensive ($3,000-$10,000), fragile instruments, operated by specially trained technicians. Proper use, results in a reliable low optical loss joint. Fusion splicing is especially attractive where large numbers of fibers need to be spliced at a given location. However, it becomes cost prohibitive to equip thousands of technicians with fusion splicers as they construct FTTH links to individual subscribers.

Mechanical splice uses a mechanical structure to align and clamp two optical fiber ends, resulting in a low-cost installed splice. It can be challenging to prepare and mate optical fiber ends in a mechanical splice and have intimate glass to glass contact every time. For example industry standard cleavers deliver +/−1 degree cleave angle on the end face of an optical fiber. When two cleaved fibers are slightly angled and mated in a mechanical splice, a small air gap can occur between the active portions of the optical fibers. In order to minimize reflection from the glass-air-glass interfaces, an index match gel is used at the fiber joint to enhance the optical performance of mechanical splices.

Common mechanical splices use substrate materials with a higher coefficient of thermal expansion (CTE) greater than the glass (silica) in the optical fibers core and cladding. Substrate examples are polyether imide materials and aluminum. CTE mismatch during thermal loading can cause the gap between the fiber tips to change with temperature, which can place demand on the index matching gel to flow and fill this variable gap.

Typical index matching gels are a thixotropic blend of silicone oil loaded with micron sized fumed silica particles. The index matching gel is selected to match the index of refraction of silica at room temperatures. Their thixotropic nature allows the index matching gels to be sheared so that the can be dispensed into the mechanical splice, but prevent the gels flowing or wicking out of the gap between the ends of the optical fibers. The index matching gels have a higher dn/dT (i.e. the change of refractive index with temperature) than silica resulting in refractive index mismatch at temperature extremes. This index of refraction mismatch at the fiber to gel interface, causes a predictable, repeatable, slight reflection signal response that varies with temperature.

An opportunity exists for a method of permanently joining the ends of optical fibers with an index matched, a low dn/dT visible light cure optical coupling adhesive.

SUMMARY OF THE INVENTION

In a first embodiment of the invention, an adhesive composition for joining optical components is described. The adhesive composition comprises at least one epoxy resin, a visible light photoinitiating system, a polyol and at least 50 wt. % of a nanoparticle filler. The visible light photoinitiating system includes at least one of a cationic photoinitiator and a sensitizer and the nanoparticle filler comprises a first nanoparticle having a first nominal size and a second nanoparticle having a second size. The adhesive composition has a refractive index between 1.44 and 1.485 and a dn/dT of less than −2E−4 when cured.

In a second embodiment of the invention, an adhesive composition for joining optical components is described. The adhesive composition comprises 5 wt. %-49.9 wt. % of at least one epoxy resin, 0.1 wt. %-30 wt. % of a polyol, a visible light photoinitiating system comprising 1%-3% of at least one of a cationic photoinitiator and 0.05%-0.5% of a sensitizer based on the weight of the epoxy resin and the polyol, a polyol and at least 50 wt. % of a nanoparticle filler. The adhesive composition has a refractive index between 1.44 and 1.485 and a dn/dT of less than −2E−4 when cured.

The above summary of the present invention is not intended to describe each illustrated embodiment or every implementation of the present invention. The figures and the detailed description that follows more particularly exemplify these embodiments.

DETAILED DESCRIPTION OF THE EMBODIMENTS

In the following detailed description of the preferred embodiments, reference is made to the accompanying drawings, which form a part hereof, and in which is shown by way of illustration specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

The exemplary adhesive may be used to join at least one optical fiber to a second optical signal transfer media. The second signal transfer media may be a second optical fiber, an optical wave guide, a lens and/or an opto-electric transceiver. The interconnection point between the at least one optical fiber to a second optical signal transfer media may be used in either an indoor or an outdoor environment.

When the exemplary adhesive is used to interconnect two optical fibers it will result in a permanent optical fiber splice. In this configuration, some of the adhesive may be disposed in the optical signal path. Thus, the exemplary adhesive should have high optical transmission (>98%) at the wavelength of the signal to be carried by the optical fiber and should be index matched to core of the optical fiber +/−0.5%, preferably +/−0.1% of the index of the core of the fiber to reduce signal losses due to back reflection. For multimode fiber, the telecommunication wavelengths are 850 nm and 1300 nm, and for single mode optical fiber, the telecommunication wavelength band about is 1250 nm-1675 nm.

In many optical applications, the adhesive bond is desirably thermally stable. The adhesive bond desirably does not allow movement of the optical fibers under a mechanical load. The fiber retention of the adhesive should be at least 1.5 lbs.

The exemplary adhesive should have a low dn/dT so that adhesive remains index matched to the optical fibers over the outside plant temperature conditions. Thus, the adhesive should have a low thermal expansion (i.e. less than 45 ppm, preferably less than 35 ppm) and a glass transition temperature of at least 50° C., preferably greater than about 70° C., more preferably greater than about 90° C.

In use, the exemplary adhesive will be used to join two optical fibers in a splice device. An exemplary splice device may include an alignment element having a base plate and a clamp plate, wherein at least one of the base plate and clamp plate having an alignment groove configured to receive the first and second optical fibers in an end-to-end manner, as described in copending U.S. patent application Ser. No. 15/695,842, herein incorporated by reference in its entirety. The exemplary adhesive can be disposed in at least a portion of the alignment groove.

The exemplary adhesive should meet the fiber pullout strength requirements of the outside plant optical fiber splice standard, without requiring a long-term external mechanical clamp to hold the splice plates of the exemplary splice device. The adhesive can be preloaded into the splice device at the factory, eliminating need for field craft to mix or dispense. Thus, the rheology of the uncured exemplary adhesive should be such that the adhesive does not migrate prior to the creation of the optical fiber splice and curing of the adhesive. Because the exemplary device may be made in the field, the tools requires to activate the cure of the adhesive must be simple and safe to use in the field. As a result, UV curable and thermally curable adhesive formulations are undesirable.

Preferably, the adhesive is curable by light of wavelengths from about 400 nm to about 700 nm, preferably from about 400 nm to about 600 nm, which includes a portion of the blue and green area of the spectrum, most preferably more preferably between 430 nm to about 480 nm. Thus, adhesive compositions of the current disclosure can be epoxy based adhesives that utilize a blue light curing mechanism to cure the adhesive. These exemplary adhesives offer the advantages of rapid cure (less than 60 seconds, preferably less than 45 seconds, more preferably less than 30 seconds) while avoiding the mixing, dispensing and heating required by conventional optical adhesives and the adhesive performs well over the broad temperature range dictated by the outside plant optical fiber splicing standards, Telcordia GR-765. Alternatively, the exemplary adhesives described herein can be used to make a splice connection that meet standard indoor performance requirements, such as TIA 568.3-D.

Exemplary light sources for curing the adhesive compositions described herein can have an output density from about 500 mW/cm$^2$ to about 3000 mW/cm$^2$ and may include a conventional blue light source such as a Paradigm™ DeepCure LED curing light available from 3M Company (St. Paul, Minn.) or can be LED curing array. In an exemplary aspect, the LED light source provides not only the photonic initiation of the polymerization reaction, but can also have sufficient energy to photonically heat the bonding area, enabling the adhesive to achieve a higher glass transition temperature (Tg) than can be generated by the photonic initiation alone. The higher Tg of the adhesive can create more stable optical splices when used to bond optical fibers in an optical splice device, allowing the resulting splice connections to pass more rigorous environmental stress tests.

In an exemplary aspect, the LED array will have a wavelength that is optimized for material curing and modification. Various form factors and features may include an LED array curing device designed to be a portable, hand held unit, for example, an LED light pen, an LED array, etc. to cover a targeted area (e.g. radial, segmented, and organic shapes). Selective control of particular LEDs in the array permits smaller material regions to be exposed. The thermal flux can be managed by a large surface area heat sink and/or forced air flow through the array.

Current approaches to optical curing often involve targeting a reactive material with large external lamps. Uniform radiometric emission levels may need to be on the order of 100 mW/cm$^2$ or much higher. When using LED-based light sources, the spectral width of the LEDs, placement and layouts are carefully defined to provide a uniform light distribution for curing at the desired wavelengths and intensities.

In an exemplary aspect, the LEDs can be arranged in a one-dimensional array, while in other aspects, the LEDs can be arranged in a two-dimensional array. In an exemplary aspect, the LEDs can be arranged in a plurality of banks or strips that are then configured into a two-dimensional array to allow selective exposure over a given cure region. LEDs can be arranged in a regular array with uniform spacing, for example with linear, hexagonal or other geometric placement to maximize light uniformity, minimize number of LEDs used, or for other reasons. In an exemplary aspect, an array of LEDs may be configured to be evenly distributed over the area intended to be cured, plus a reasonable perimeter, from a small fraction of the total area, to several times the total area, to insure uniform curing of a sample from center to edges.

In one aspect, the exemplary adhesive can be cured using an LED array curing source after about a 60 second exposure, preferably after about a 30 second exposure.

The exemplary adhesives are highly filled to reduce the thermal expansion of the cured adhesive and lower the dn/dT of the adhesives. There are many commercially available adhesives that have a low coefficient of thermal expansion which incorporate conventional fillers such as alumina, quartz or other inorganic particles. These conventional fillers are unacceptable for applications where optical transmission through the adhesive is required. Because the average size of these fillers is generally larger than optical wavelengths (e.g., wavelengths in the visible or infrared regions of the electromagnetic spectrum), the fillers scatter the light and prevent the transmission of the light through the adhesive. The use of nanoparticle fillers over the micron sized filler particles commonly used in commercial index matching gels allows more intimate optical fiber contact between the end faces of the optical fibers being joined.

The need for a low refractive index can preclude the use of common phenol based epoxy materials such diglycidyl ethers of bisphenol A, diglycidyl ethers of bisphenol F, novolac epoxy resins, resorcinol based epoxy resins, etc.

Suitable epoxy resins for use in the exemplary adhesive should have a refractive index less than about 1.53 and can include monomeric or oligomeric epoxy compounds that can be aliphatic, alicyclic, or heterocyclic. In an alternative aspect, when two or more epoxy resins are used, the mixture of resins should have a refractive index less than 1.50. The terms "epoxy resin" and "epoxide" and "epoxy-containing material" are used interchangeably. These materials generally have, on the average, more than 1 polymerizable epoxy group per molecule. Some epoxy resins have at least 1.5 or at least 2 polymerizable epoxy groups per molecule. The average molecular weight of the epoxy-containing materials can vary from about 58 g/mole to about 1000 g/mole or more.

Some suitable epoxy resins include vinylcyclohexene dioxide; 3,4-epoxycyclohexylmethyl-3,4-epoxycyclohexane carboxylate; bis(3,4-epoxy-6-methylcyclohexylmethyl) adipate; bis(2,3-epoxycyclopentyl) ether; aliphatic epoxy modified from polypropylene glycol; dipentene dioxide; epoxy functional silicone containing resins; bis(3,4-epoxycyclohexyl)adipate; 2-(3,4-epoxycyclohexyl-5,5-spiro-3,4-epoxy) cyclohexane-meta-dioxane; vinylcyclohexene monoxide; polyfunctional glycidyl ethers such as diglycidyl ether of 1,4-butanediol; diglycidyl ether of neopentyl glycol; diglycidyl ether of cyclohexanedimethanol; trimethylol ethane triglycidyl ether; trimethylol propane triglycidyl ether and the like.

Still other useful epoxy resins include epoxy-functional silicones such as those described in U.S. Pat. No. 4,279,717 (Eckberg et al.), which are commercially available from the General Electric Company. These epoxy resins are polydimethylsiloxanes in which 1 to 20 mole percent of the silicon atoms have been substituted with epoxyalkyl groups (preferably, epoxy cyclohexylethyl, as described in U.S. Pat. No. 5,753,346 (Leir et al.)). Some exemplary materials can include 1,3-di[2-(3,4-epoxycyclohexyl)ethyl]-1,1,3,3-tetramethyldisiloxane and epoxypropoxypropyl terminated polydimethysiloxane.

In some embodiments, the adhesive composition contains at least 25 wt. %, at least 30 wt. %, at least 35 wt. % or at least 40 weight percent epoxy resin based on the weight of the adhesive composition. Some adhesive compositions contain, up to 45 wt. %, or up to 40 wt. % epoxy resin. For example, the adhesive compositions can contain 25 wt. % to 45 wt. %, 30 wt. % to 45 wt. %, 25 wt. % to 40 wt. %, or 30 wt. % to 40 wt. % epoxy resin based on the weight of the adhesive composition.

The adhesive composition can further include a polyol in addition to the epoxy resin. As used herein, the term "polyol" refers to an organic compound having two or more hydroxy groups. The polyol can be added as a chain extender for the epoxy resin and can be a source of protons for the cationic polymerization reaction. When a polyol is added, any process used to remove water and the optional water-miscible solvent is conducted either prior to the addition of the polyol or under conditions that do not remove the polyol.

Suitable diols (i.e., polyols with two hydroxy groups) include, but are not limited to, 1,2-ethanediol, 1,2-propanediol, 1,3-propanediol, 1,4-butanediol, 1,3-butanediol, 2-methyl-1,3-propanediol, 2,2-dimethyl-1,3-propanediol, 2-ethyl-1,6-hexanediol, 1,5-pentanediol, 1,6-hexanediol, 1,8-octanediol, neopentyl glycol, glycerol, trimethylolpropane, 1,2,6-hexanetriol, trimethylolethane, pentaerythritol, quinitol, mannitol, sorbitol, diethylene glycol, triethylene glycol, tetraethylene glycol, glycerine, 2-ethyl-2-(hydroxymethyl)-1,3-propanediol, 2-ethyl-1,3-pentanediol, 1,4-cyclohexanedimethanol, and 1,4-benzene-dimethanol.

When a polyol is present in the adhesive composition, the polyol is typically present in an amount, up to 30 wt. %, up to 20 wt. %, up to 10 wt. %, or up to 5 wt. % based on the weight of the adhesive composition. The polyol can be present in an amount of at least 0.5 wt. %, at least 1 wt. %, at least 2 wt. %, or at least 3 wt. % based on the weight of the adhesive composition. The polyol is often present in an amount of 0.5 wt. % to 10 wt. %, 1 wt. % to 10 wt. %, 0.5 wt. % to 5 wt. %, or 1 wt. % to 5 wt. % based on the weight of the adhesive composition.

The adhesive composition contains surface-modified nanoparticles, in particular surface-modified silica nanoparticles. The surface-modified nanoparticles are added to the exemplary adhesive to modify the adhesive's mechanical, thermal and optical properties. For example, the surface-modified nanoparticles can be added to the adhesive to reduce the coefficient of thermal expansion (CTE) of the adhesive. The CTE of an unfilled epoxy can be greater than 60 μm/m-° C. When bonding an optical fiber to a rigid substrate, the CTE of the adhesive should be as low as possible so that the adhesive does not exert undue forces on the fiber due to changing temperature which could result in signal loss or breakage of the optical fiber. In order to make a significant change to the CTE of the adhesive, the adhesive needs to be highly loaded with a filler having a low CTE. However, the addition of high levels of nanoparticles can have a detrimental effect on the rheology of the particle-loaded adhesive which can make it difficult to dispense or complicate insertion of the fiber into the adhesive. For example, at high loadings, the viscosity of a resin system can become excessively high, even to the point of becoming gel-like. It is well-known that the smaller the nanoparticle size, the lower the particle loading must be to avoid excessive viscosity build. In addition, the presence of nanoparticles can lead to viscosity increases with increases in temperature, shear rate, or both.

To overcome these effects, some embodiments of the exemplary adhesive composition may contain a combination of two different sized, surface-modified silica nanoparticles, or in other words comprises a bimodal distribution of surface-modified silica nanoparticles. As used herein, the term "surface modified nanoparticles" refer to the attachment of surface treatment agents into the surface of the nanoparticle. The term "nanoparticles" used in the present adhesive formulations refer to particles having an average diameter no greater than 500 nm. The term "diameter" refers not only to the diameter of substantially spherical particles but also to the longest dimension of non-spherical particles. Note that the particle sizes referred to herein are the nominal sizes provided by the vendor.

The term "bimodal distribution of surface-modified silica nanoparticles" refers to a collection of particles having particles with two primary sizes. In some embodiments, the bimodal distribution of the surface-modified nanoparticles can have first particles having a first average particle size, $D1$, between 70 nm and 200 nm, inclusive. In some embodiments, the first average particle size of the first particles is at least 70 nm, at least 80 nm, or even at least 90 nm. In some embodiments, the first average particle size of the first particles is no greater than 200 nm, or no greater than 150 nm.

The bimodal distribution of the surface-modified nanoparticles of the present disclosure also includes second particles having a second average particle size. The second average diameter, $D2$, of the second particles is less than the first average diameter of the first particles (i.e. $D2<D1$). In some embodiments, the second average particle size of the second particles, is no greater than 60 nm, e.g., no greater than 50 nm, or no greater than 30 nm. In some embodiments, $D2$ is at least 5 nm, e.g., at least 10 nm. In some embodiments, $D2$ is between 15 and 60 nm, inclusive.

As described herein, the sizes of the first and second particles are defined relative to each other such that the first average particle size of the first particles, D1, is greater than the second average particle size of the second particles, D2. In some embodiments, the ratio of the first average particle size of the first particles to the second average particle size of the second particles, D1:D2, is at least 2:1. Generally, the ratio of D1:D2 is no greater than 30:1, preferably 7:1. In some embodiments, the ratio of D1:D2 is between 2:1 and 7:1.

As used herein, the weight percent of nanoparticles in the adhesive composition is based on all nanoparticles present in the adhesive composition. Generally, the percent by weight of nanoparticles is based on the combined weight of the resin component and the nanoparticles in the adhesive composition, and is no greater than 80 wt. %. In some embodiments, the adhesive composition contains at least at least 40 wt. % of nanoparticles.

The use of nanoparticles in adhesive compositions is of particular interest when working in optical communication applications. Because the wavelengths of light used in optical communication applications are longer than the diameter of the silica nanoparticles (e.g., the wavelengths used are often about 10 to 20 times longer than the average diameter of the silica nanoparticles), the silica nanoparticles typically do not scatter the optical signal when it passes through an adhesive with nanoparticles. More particularly, the silica nanoparticles usually allow high transmission of visible and infrared wavelengths of light through the adhesive.

Suitable silica nanoparticles are often available in the form of a sol, which is a colloidal dispersion of amorphous silica nanoparticles in a liquid medium. The liquid medium can be water, an organic solvent, or water/organic solvent mixture.

The silica nanoparticles preferably have a relatively uniform size (i.e., diameter) and remain non-aggregated in the liquid medium, (i.e. less than 1 wt. %, less than 0.5 wt. %, or less than 0.2 wt. % of the silica nanoparticles in the adhesive composition are aggregated). As used herein, the term "non-aggregated" means that the silica nanoparticles or the surface-modified silica nanoparticles are substantially free of aggregated nanoparticles, which refers to clusters or clumps or nanoparticles that are firmly associated with one another and that can typically only be separated with high shear. Particle aggregation can result in precipitation, gelation, a substantial viscosity increase, or light scattering in the final adhesive composition.

Silica hydrosols, having water as the liquid medium, are commercially available in a variety of particle sizes and concentrations from Nyacol Products, Inc. (Ashland, Md.), Nalco Chemical Co. (Naperville, Ill.), and DuPont Chemical Co. (Wilmington, Del.). The concentration of silica nanoparticles is often in the range of 10 to 50 wt. % based on the weight of the hydrosol. Concentrations of silica nanoparticles in the range of 30 to 50 wt. % based on the weight of the hydrosol are often preferred because less water needs to be removed after surface modification.

The silica nanoparticles are surface modified using a surface modification mixture that contains (a) silica nanoparticles, (b) a silane surface modifying agent in a sufficient amount to form a monolayer on the surface of the silica nanoparticles, (c) an excess amount of water, and (d) an optional water-miscible solvent. After reaction with the surface modifying agent, the silica nanoparticles are typically non-aggregated and usually have a monolayer of the surface-modifier covalently attached to the surface.

Suitable silane surface modifying agents include, but are not limited to, alkyltrialkoxysilanes such as methyltrimethoxysilane, methyltriethoxysilane, ethyltrimethoxysilane, ethyltriethoxysilane, n-propyltrimethoxysilane, n-propyltriethoxysilane, iso-propyltrimethoxysilane, iso-propyltriethoxysilane, butyltrimethoxysilane, butyltriethoxysilane, hexyltrimethoxysilane, n-octyltrimethoxysilane, n-octyltriethoxysilane, isooctyltrimethoxysilane, dodecyltrimethoxysilane, and octadecyltrimethoxysilane; aryltrialkoxysilanes such as styrylethyltrimethoxysilane, phenyltrimethoxysilane, phenyltriethoxysilane, and p-tolyltriethoxysilane; 3-glycidoxypropyltrialkoxysilane such as glycidoxypropyltrimethoxysilane; alkyltrichlorosilanes such as methyltrichlorosilane; aryltrichlorosilanes such as phenyltrichlorsilane, phenylethyltrichlorosilane, phenoxytrichlorosilane, and p-tolyltrichlorosilane; and combinations thereof.

The surface modification mixture contains water and an optional water-miscible solvent. Suitable optional water-miscible solvents include, but are not limited to, alcohols (e.g., methanol, ethanol, n-propanol, isopropanol, 1-methoxy-2-propanol, or butanol), ethers (e.g., diethyl ether or tetrahydrofuran), dimethylformamide, dimethylsulfoxide, acetonitrile, and the like. The optional water-miscible solvent is typically chosen to have a boiling point that allows removal at a temperature suitable for removal of the water.

In some embodiments, there is no optional water-miscible solvent in the surface-modification mixture. In other embodiments, the volume ratio of water to water-miscible solvent is at least 99:1 (i.e., 99 parts of water to 1 part water-miscible solvent), at least 98:2, at least 95:5, at least 90:10, at least 85:15, at least 80:20, at least 75:25, at least 70:30, at least 65:35, at least 60:40, at least 55:45, at least 50:50, at least 45:55, at least 40:60, or at least 30:70. The optional water-miscible solvent can be used to increase the solubility of the surface modifying agent.

Suitable reaction conditions (e.g. time and temperature) for covalently bonding the surface modification agent to the surface of the silica nanoparticles can vary depending on the presence or absence of a water-miscible solvent, the nature of the water-miscible solvent, and the presence or absence of a catalyst to accelerate the reaction. The catalyst can include, but is not limited to, ammonia, amines and fluoride ions.

The surface-modified silica nanoparticles are dispersed in an epoxy resin. At least most of the water and optional water-miscible solvent in the surface-modification mixture is removed by evaporation or distillation. The removal of the water and optional water-miscible solvent can occur either before or after addition of the epoxy resin (i.e., either before or after formation of the dispersion). Suitable methods of removing the water and optional water-miscible solvent include, but are not limited to, rotary evaporation, thin film evaporation, simple distillation, azeotropic distillation, gap drying, or spray drying.

The adhesive composition often contains at least 50 wt. %, at least 55 wt. %, at least 60 wt. %, or at least 65 wt. % surface-modified silica nanoparticles based on the weight of the adhesive composition. Some adhesive compositions contain up to 75 wt. %, up to 70 wt. %, or up to 80 wt. % surface-modified silica nanoparticles. For example, the adhesive composition can contain 50 to 75 wt. %, 50 to 70 wt. %, 55 to 70 wt. %, 55 to 75 wt. %, 55 to 80 wt. %, 60 to 70 wt. %, 60 to 75 wt. %, 60 to 80 wt. %, 65 to 70 wt. %, 65 to 75 wt. %, or 65 to 80 wt. % surface-modified silica nanoparticles.

The photoinitiator system can initiate the cationic polymerization of the exemplary adhesive formulation and more preferably will accelerate the polymerization. The photoinitiator system is one which is capable of light absorption in the visible range, i.e., between about 400 nm and about 700 nm. In preferred assemblies of the invention, the photoinitiator system absorbs light between about 400 nm and about 600 nm, more preferably between 430 nm to about 480 nm, in the blue portion of the spectrum. Components in the photoinitiator system include at least one initiator, at least one sensitizer, and optionally, an electron donor.

Useful sensitizers should be soluble in the epoxy monomers, capable of light absorption in the appropriate wavelengths, and shelf stable for reasonable periods of time.

Suitable sensitizers are believed to include compounds in the following categories: ketones, coumarin dyes (e.g., ketocoumarins), xanthene dyes, acridine dyes, thiazole dyes, thiazine dyes, oxazine dyes, azine dyes, aminoketone dyes, porphyrins, aromatic polycyclic hydrocarbons, p-substituted aminostyryl ketone compounds, aminotriaryl methanes, merocyanines, squarylium dyes and pyridinium dyes. Ketones (e.g., monoketones or α-diketones), ketocoumarins, aminoarylketones and p-substituted aminostyryl ketone compounds are preferred sensitizers. For applications requiring high sensitivity, it is preferred to employ a sensitizer containing a julolidinyl moiety. For applications requiring deep cure (e.g., where the adhesive or the substrates attenuate radiation of similar wavelengths), it is preferred to employ sensitizers having an extinction coefficient below about 1000, more preferably below about 100, at the desired wavelength of irradiation for photopolymerization.

Suitable ketones of the above formula include monoketones such as 2,2-dihydroxybenzophenone, 4,4-dihydroxybenzophenone, or 2,4-dihydroxybenzophenone, di-2-pyridyl ketone, di-2-furanyl ketone, di-2-thiophenyl ketone, benzoin, fluorenones, quinones, e.g., chloroquinone, 2-aza-3-carboxy-9-fluorenone, and the like, chalcone, Michler's ketone, 2-fluoro-9-fluorenone, 2-chlorothioxanthone, 2-isopropylthioxanthone, acetophenone, benzophenone, 1- or 2-acetonaphthone, 9-acetylantracene, 2-acetylphenanthrene, 3-acetylphenanthrene or 9-acetylphenanthrene, 4-acetylbiphenyl, propiophenone, n-butyrophenone, valerophenone, 2-acetylpyridine, 3-acetylpyridine or 4-acetylpyridine, 3-acetylcoumarin and the like. Suitable diketones include aralkyldiketones such as anthraquinone, phenanthrenequinone, o-, m- and p-diacetylbenzene, 1,3-diacetylanthracene, 1,4-diacetylanthracene, 1,5-diacetylanthracene, 1,6-diacetylanthracene, 1,7-diacetylanthracene and 1,8-diacetylnaphthalene, 1,5-diacetylanthracene, 1,8-diacetylanthracene and 9,10-diacetylanthracene, and the like. Suitable α-diketones include 2,3-butanedione, 2,3-pentanedione, 2,3-hexanedione, 3,4-hexanedione, 2,3-heptanedione, 3,4-heptanedione, 2,3-octanedione, 4,5-octanedione, benzil, 2,2'-dihydroxylbenzil, 3,3'-dihydroxylbenzil and 4,4'-dihydroxylbenzil, furil, di-3,3'-indolylethanedione, 2,3-bornanedione (camphorquinone), 1,2-cyclohexanedione, 1,2-naphthaquinone, acenaphthaquinone, and the like.

In one aspect, the sensitizer can be initially colored prior to curing of the adhesive composition, undergo a reaction when exposed to the activating light which results in a color change to indicate the onset of cure in the adhesive composition. Other sensitizers could optionally include Rose Bengal, Methylene Violet, Fluorescein, Eosin Yellow, Eosin Y, Ethyl Eosin, Fosin Bluish, Erythrosin Yellowish Blend, 4',5'-Dibromofluorescein.

The photoinitiator system can also include an electron donor. A wide variety of donors can be used; the donor should be soluble in the monomer, and have good shelf stability. Suitable donors are capable of increasing the speed of cure or depth of cure of a composition upon exposure to light of the desired wavelength.

The optional electron donors can include amines (including aminoaldehydes and aminosilanes), amides (including phosphoramides), anthrocenes, ethers (including thioether), ureas (including thioureas), ferrocene, sulfinic acids and their salts, salts of ferrocyanide, ascorbic acid and its salts, dithiocarbamic acid and its salts, salts of xanthates, salts of ethylene diamine tetraacetic acid, and salts of tetraphenylboronic acid. The donor can be unsubstituted or substituted with one or more non-interfering substituents. Particularly preferred donors contain an electron donor atom such as a nitrogen, oxygen, phosphorus, or sulfur atom, and an abstractable hydrogen atom bonded to a carbon or silicon atom alpha to the electron donor atom.

Preferred amine donor compounds include alkyl-, aryl-, alkaryl- and aralkyl-amines such as methylamine, ethylamine, propylamine, butylamine, triethanolamine, amylamine, hexylamine, 2,4-dimethylaniline, 2,3-dimethylaniline, o-, m- and p-toluidine, benzylamine, aminopyridine, N,N'-dimethylethylenediamine, N,N'-diethylethylenediamine, N,N'-dibenzylethylenediamine, N,N'-diethyl-1,3-propanediamine, N,N'-diethyl-2-butene-1,4-diamine, N,N'-dimethyl-1,6-hexanediamine, piperazine, 4,4'-trimethylenedipiperidine, 4,4'-ethylenedipiperidine, p-N,N-dimethylaminophenethanol and p-N,N-dimethylaminobenzonitrile; aminoaldehydes such as p-N,N-dimethylaminobenzaldehyde, p-N,N-diethylaminobenzaldehyde, 9-julolidine carboxaldehyde and 4-morpholinobenzaldehyde; and aminosilanes such as trimethylsilylmorpholine, trimethylsilylpiperidine, bis(dimethylamino)diphenylsilane, tris(dimethylamino)methylsilane, N,N-diethylaminotrimethylsilane, tris(dimethylamino)phenylsilane, tris(methylsilyl)amine, tris(dimethylsilyl)amine, bis(dimethylsilyl)amine, N,N-bis(dimethylsilyl)aniline, N-phenyl-N-dimethylsilylaniline and N,N-dimethyl-N-dimethylsilylamine. Tertiary aromatic alkylamines, particularly those having at least one electron-withdrawing group on the aromatic ring, have been found to provide especially good shelf stability. Good shelf stability has also been obtained using amines that are solids at room temperature.

Preferred amide donor compounds include N,N-dimethylacetamide, N,N-diethylacetamide, N-methyl-N-phenylacetamide, hexamethylphosphoramide, hexaethylphosphoramide, hexapropylphosphoramide, trimorpholinophosphine oxide and tripiperidinophosphine oxide.

The present invention features a photoinitiator for a cationically polymerizable adhesive composition. In one embodiment, the system includes an onium salt such as an iodonium salt or a sulphonium salt. The iodonium salt for the photoinitiator system may be, for example, diaryliodonium hexafluorophosphate, diaryliodonium hexafluoroantimonate, diaryliodonium tetrakis(pentafluorophenyl)borate, 4-octyloxyphenyl phenyliodonium hexafluoroantimonate, 4-(2-hydroxytetradecyloxyphenyl)phenyliodonium hexafluoroantimonate, 4-(1-methylethyl)phenyl 4-methylphenyliodonium tetrakis(pentafluorophenyl)borate, or combinations thereof.

In other embodiments, the cationic photoinitiator could be a sulfonium salt. Useful sulfonium salt photoacid generators include a mixture of triarylsulfonium salts (diphenyl(4-phenylthio) phenylsulfonium hexafluoroantimonate and bis (4-(diphenyl sulfonio)phenyl)sulfide hexafluoroantimonate) available as UVI-6976 from Synasia Metuchen, N.J., a mixture of diphenyl(4-phenylthio)phenylsulfonium hexafluorophosphate, bis(4-(diphenylsulfonio)phenyl)sulfide bis(hexafluorophosphate) available as UVI-6992 from Synasia (Metuchen, N.J.)., and triphenyl sulfonium hexafluoroantimonate available under the trade designation CT-548 from Chitec Technology Corp. (Taipei, Taiwan).

The individual components of the photoinitiator system are provided in photopolymerizingly effective amounts (i.e., amounts effective to yield a photoinitiator system that can initiate photopolymerization of the cationically polymerizable resin or, more preferably, that can accelerate the rate of polymerization). Preferably, the visible light sensitizer is present at about 0.05-5.0 weight percent based on the reactive components of the adhesive composition (e.g. the total of the epoxy resin and the polyol in the adhesive composition), more preferably, at about 0.10-2.5 weight percent. The onium salt is preferably present at about 0.05-10.0 weight percent based on the reactive component of the adhesive composition, more preferably at about 0.10-5.0 weight percent, and most preferably at about 0.50-3.0 weight percent. The optional electron donor compound or compounds are preferably present at about 0.01-5.0 weight percent, based on the reactive component of the adhesive composition, more preferably about 0.05-1.0 weight percent, and most preferably about 0.05-0.50 weight percent when they are present in the adhesive composition.

Particularly useful anthracene-based compounds include: 2-ethyl-9,10-dimethoxyanthracene (EDMOA), 9,10-dimethylanthracene, 9,10-diethoxyanthracene, 1,4-dimethoxyanthracene, 9-methylanthracene, 2-ethylanthracene, 2-tert-butylanthracene, 2,6-di-tert-butylanthracene, 9,10-diphenyl-2,6-di-tert-butylanthracene, and combinations thereof. All of these compounds with the exception of the 2,6-di-tert-butylanthracene derivatives are available from Sigma-Aldrich, (Milwaukee, Wis.). In some embodiments, the anthracene-based compounds will absorb visible light and can be used as the sensitizer.

Additional optional materials can be can be added to the adhesive composition such as rheological modifiers, and a colorant that signals when there has been sufficient exposure to a light source to cure the adhesive.

In many optical applications, the adhesive bond is desirably thermally stable. The adhesive bond desirably does not allow movement of the optical fibers under a mechanical load. The fiber retention of the adhesive should be at least 1.5 lbs.

The cured adhesive composition should have Tg over 45° C., preferably over 50° C. after blue light exposure, a refractive index between about 1.44 to about 1.485, preferably between about 1.44 to about 1.47, preferably about 1.45 at 1330 nm and a dn/dT less than −20E−5/° C., preferably less than less than −15E−5/° C., and more preferably less than −10E−5/° C. In alternative embodiments, the exemplary adhesives can have a Tg of greater than about 70° C., preferably greater than about 90° C.

EXAMPLES

These examples are for illustrative purposes only and are not meant to be limiting on the scope of the appended claims. All parts, percentages, ratios, etc. in the examples and the rest of the specification are by weight, unless otherwise noted. Solvents and reagents were obtained from Sigma Aldrich Chemical Company (Milwaukee, Wis.), unless otherwise noted.

| | Materials |
|---|---|
| Epoxy 1A | 3,4 epoxycyclohexylmethyl-3,4-epoxy-cyclohexane carboxylate such as ERL-4221e available from Polysciences, Inc. (Warrington, PA). |
| Epoxy 1B | 3,4 epoxycyclohexylmethyl-3,4-epoxy-cyclohexane carboxylate such as Celloxide 2021P available from Daicel (Fort Lee NJ). CAS 2386-87-0 |
| Epoxy 2 | Diglycidyl ether of neopentyl glycol such as HELOXY ™ Modifier 68, available from Hexion (Columbus, OH). CAS 17557-23-2 |
| Epoxy 3 | 1,3-bis[2(3,4-epoxycyclohexyl)ethyl]tetramethyldisiloxane, such as SIB 1092.0 available from Gelest (Morrisville PA). CAS 18724-32-8. |
| Diol 1 | 1,5-pentanediol available from Sigma Aldrich (Milwaukee, WI). CAS 111-29-5. |
| Diol 2 | 1,3-propanediol, such as Susterra Propanediol, available from DuPont Tate and Lyle BioProducts. CAS 504-63-2. |
| Thermal initiator | K-Pure CXC ® 1612, proprietary SbF6 salt available from King Industries Inc. (Norwalk, CT). |
| Photoinitiator 1 | Bis(4-tert-butylphenyl)iodonium hexafluoroantimonate, available as Part No. FP50304 from Hampford Research (Stratford CT). CAS 61358-23-4 |
| Photoinitiator 2 | 4-Octyloxydiphenyliodonium hexafluoroantimonate, available from Hampford Research (Stratford, CT). CAS 121239-75-6 |
| Sensitizer | Camphorquinone such as available from Sigma Aldrich Chemical Company (Milwaukee, WI). CAS 10373-78-1 |
| Electron donor | 9,10-diethoxyanthracene, such as Anthracure UVS 1101 available from Kawasaki Kasei Chemicals LTD (Kanagawa Japan). CAS 68818-86-0 |
| Filler 1 | Aqueous silica nanoparticle sol, such as Nalco TX 10693, available from Nalco Chemical (Naperville IL). Typical particle size 90 nm |
| Filler 2 | Aqueous silica nanoparticle sol, such as Nalco TX 15827 (more recently known as Nalco 15827), available from Nalco Chemical (Naperville IL). Typical particle size 140 nm |
| Filler 3 | Aqueous silica nanoparticle sol, such as Nalco 2327, available from Nalco Chemical (Naperville IL). Typical particle size 20 nm |
| Silane 1 | Trimethoxyphenylsilane, available from Gelest (Morrisville PA). CAS 2996-92-1. |
| Silane 2 | 2-(3,4-epoxycyclohexyl)-ethyltrimethoxysilane, available from Gelest (Morrisville PA). CAS 3388-04-3 |
| Silane 3 | Trimethoxypropylsilane, available from Alfa Aesar (Haverhill, MA). CAS 1067-25-0 |

-continued

| Materials | |
|---|---|
| Silane 4 | Silres BS 1316, available from Wacker silicones (Adrian MI). Mix of isomers of isooctyl trimethoxysilane. CAS 34396-03-7 |

| Commercially available low index adhesives | |
|---|---|
| C2 | SMARTGEL OC-431A index matching gel available from Nye Lubricants, Inc. (Fairhaven, MA) |
| C3 | 3M ™ Filtek Bulk Fill Posterior Restorative, available from 3M Company (St. Paul, MN) |
| C4 | 3M ™ Filtek Supreme ultra, available from 3M Company (St. Paul, MN) |
| C5 | Norland Optical Adhesive NOA 85 available from Norland Products, Inc. (Cranbury, NJ) |
| C6 | Norland Optical Adhesive NOA 85V available from Norland Products, Inc. (Cranbury, NJ) |
| C7 | Norland Optical Adhesive NOA 84 available from Norland Products, Inc. (Cranbury, NJ) |
| C8 | Norland Optical Adhesive NOA 144 available from Norland Products, Inc. (Cranbury, NJ) |
| C9 | OP-20 high Performance Adhesive available from Dymax Corporation (Torrington, CT) |
| C10 | 535-AN UV-curable, high Tg Epoxy Adhesive available from Addison Clear Wave Coatings. Inc. (St. Charles, IL) |

Test Methods

Glass Transition Temperature (Tg) and Residual Cure

Glass transition temperatures and residual cure information were determined with a TA Instruments Q2000 Differential Scanning calorimeter (available from TA Instruments, New Castle, Del.) using a heating rate of 5° C./min (Tables 1 and 2) or 4° C./min (Tables 3 and 4).

The results of this test for selected adhesives is shown in Tables 1, 3 and 4 for exemplary epoxy adhesive compositions and Tables 2 and 4 for commercially available comparative adhesive materials.

Index of Refraction at 589 nm and dn/dT of Uncured Adhesive Samples

An Abbe Refractometer (model No. 1T available from Atago U.S.A., Inc) was used to measure the index of refraction of the uncured samples at the Sodium D-Line wavelength (589 nm). An Abbe Refractometer with a water bath was used to control the temperature for the uncured 589 nm dn/dT measurements.

The results of this test for selected adhesives is shown in Table 1 for exemplary epoxy adhesive compositions and Table 2 for commercially available adhesive materials.

Determination of Refractive Index and dn/dT of Cured Adhesive Samples by a Reflectance Measurement Technique from 1250 nm to 1720 nm The end of a piece of SMF 28 single mode optical fiber is cleaved using a C1-01 cleaver available from Ilsintech Company, Ltd. (Dallas, Tex.) to produce a perpendicular end face (i.e. the end face of the optical fiber varies less than 0.5° from perpendicular with respect to the axis of the optical fiber).

An Ando AQ6317B optical signal analyzer from Ando Electric Company, Ltd. (Japan) and a broadband light source, for example a SLED from GoLight SLED-EB-D-1250-1720-20-FC/AP, are connected in parallel to one side of a 1×2 coupler and the cleaved optical fiber is attached to the other side of said coupler. The cleaved end of the optical fiber with adhesive disposed thereon is placed in a controlled temperature environment. A base scan of the light reflected by the cleaved end face is measured from 1250 nm to 1720 nm yielding a base spectra is saved.

A drop of a sample adhesive is placed on the cleaved end face of the optical fiber and cured using a Paradigm Deep-Cure Curing Light available from 3M Company (St. Paul, Minn.) for 60 seconds. The cleaved end of the optical fiber with adhesive disposed thereon is placed in a controlled temperature environment. A test scan of the light reflected by the glass at cleaved end face with the cured sample adhesive is measured from 1250 nm to 1720 nm yielding a sample spectra. This process is repeated at 20° C., 40° C., 60° C., and 80° C. The base spectra is subtracted from the sample spectra for each temperature condition to give a test spectra.

An average reflectance value is obtained from the test spectra at each temperature condition. The index of refraction was calculated for the material being analyzed using the Fresnel equation to provide measured reflection at 80° C. Then dn/dT is calculated from the slope of the line through the calculated index values when plotted against their corresponding temperature.

The results of this test for selected adhesives is shown in Table 1 for exemplary epoxy adhesive compositions and Table 2 for commercially available adhesive materials.

Young's Modulus and Hardness

The modulus and hardness of the adhesive samples was found using a G200 nanoindenter in GCM mode with a Berkovich diamond probe after curing the adhesive with a Paradigm™ DeepCure LED curing light available from 3M Company (St. Paul, Minn.) for the designated cure time. An approach velocity of 10 nm/sec was used.

The results of this test for selected adhesives is shown in Table 1.

Adhesion

The terminal portion of an SMF 28 single mode optical fiber was stripped to remove the acrylic buffer coating and cleaned with isopropyl alcohol. The end of the bare glass portion of the optical fiber was cleaved to either a 2 mm cleave length, a 5 mm cleave length or a 10 mm cleave length. A drop of a sample adhesive was placed on a microscope slide and the stripped and cleaved bare glass portion of the optical fiber was placed in the adhesive drop. Another microscope slide was placed on top such that the bond thickness between the glass slides was 250 microns. The adhesive was cured with a Paradigm™ DeepCure curing light for 1 minute. The test sample was placed in an Instron 5966 Series Mechanical Testing System, available from (Norwood, Mass.), using a 500N load cell and the fiber was pulled at a 6 mm/min. crosshead speed.

The results of this test for selected adhesives is shown in Table 1.

Coefficient of Thermal Expansion

Coefficient of Thermal Expansion (CTE) was determined using TA Instruments Q400 Thermal Mechanical Analyzer (available from TA Instruments, New Castle, Del.) with a penetration probe with a 0.25N preload force. The first heat cycle was from −20° C. to 150° C. at 4° C./min and then held for 2 minutes. The sample was cooled from 150° C. to −10° C. at 4° C./min and held for 2 minutes. The second heat cycle was from −10° C.-130° C. at 4° C./min and held for 2 minutes. CTE values for the selected temperature ranges are provided in Table 5.

Surface Modification of Nanoparticles

Pretreatment of Silica Sols

Prior to surface modification, silica sol having an initial pH between 8-10.5 was placed in a beaker and while stirring at low speed, the rinsed ion exchange resin (Amberlite IR-120(H) ion exchange resin from Alfa Aesar) was added by small spoonful's. About 3-5 minutes after each addition, the pH was measured. Once the pH had been reduced to about 2.5, no further ion exchange resin was added. The sol/ion exchange resin mixture was stirred for 45-60 minutes, after which the ion exchange resin was filtered off.

90 nm Phenylsilane Modified Silica (90 nm PsMS-1)

915 g of Nalco TX 10693 aqueous silica sol (Filler 1), 11.21 g Silane 1 (trimethoxyphenylsilane), and 1000 g 1-methoxy-2-propanol were mixed in a three-neck round bottom flask equipped with an overhead air stirrer, thermometer, condenser, then heated at 90-95° C. for 18-20 hours. The resulting solution was 20.7% silica as determined by oven solids and thermogravimetric analysis.

20 nm Phenylsilane Modified Silica (20 nm PsMS)

The nanoparticles in the Filler 3 sol were surface modified with Silane 1 (trimethoxyphenylsilane) in a tubular reactor according to the process described in U.S. Pat. No. 8,394,977, herein incorporated by reference.

The surface treatment agent (trimethoxyphenylsilane) was added to the Filler 3 sol and stirred for 5 minutes at room temperature (23 deg. C.). A co-solvent (1-methoxy-2-propanol) was added to the sol/silane mixture over a 5 minute period and the resulting dispersion was continuously stirred prior to delivery to the tubular reactor. The resulting solution was 14.7% silica as determined by oven solids and thermogravimetric analysis.

140 nm Phenylsilane Modified Silica (140 nm PsMS)

The nanoparticles in the Filler 2 sol were surface modified with Silane 1 (trimethoxyphenylsilane) in a tubular reactor according to the process described in U.S. Pat. No. 8,394,977, herein incorporated by reference.

The surface treatment agent trimethoxyphenylsilane) was added to the Filler 2 sol and stirred for 5 minutes at room temperature (23 deg. C.). A co-solvent (1-methoxy-2-propanol) was added to the sol/silane mixture over a 5 minute period and the resulting dispersion was continuously stirred prior to delivery to the tubular reactor. The resulting solution was 14.7% silica as determined by oven solids and thermogravimetric analysis.

90 nm Phenylsilane/Cycloaliphatic Epoxy Modified Silica. (90 nm PsCaEMS)

450 g Nalco TX 10693 aqueous silica sol (Filler 1) 4.17 g Silane 1 (trimethoxyphenylsilane), 1.72 g Silane 2 (2-(3,4-epoxycyclohexyl)-ethyltrimethoxysilane), and 450 g 1-methoxy-2-propanol were mixed in a three-neck round bottom flask equipped with an overhead air stirrer, thermometer, condenser, then heated at 90-95° C. for 18-20 hours. The resulting solution was 21.5% silica as determined by oven solids and thermogravimetric analysis.

90 nm Phenylsilane/Trimethoxypropylsilane Modified Silica. (90 nm PsPrsMS)

450 g Nalco TX 10693 aqueous silica sol (Filler 1) 4.17 g Silane 1 (trimethoxyphenylsilane), 1.15 g Silane 3 (trimethoxypropylsilane) and 450 g 1-methoxy-2-propanol were mixed in a three-neck round bottom flask equipped with an overhead air stirrer, thermometer, condenser, then heated at 90-95° C. for 18-20 hours. The resulting solution was 21.0% silica as determined by oven solids and thermogravimetric analysis.

140 nm Phenylsilane/Isooctyl Silane Modified Silica. (140 nm PsIosMS)

Prior to surface modification, the Filler 2 sol having an initial pH between 8-10.5 was placed in a beaker and while stirring at low speed, the rinsed ion exchange resin (Amberlite IR-120(H) ion exchange resin from Alfa Aesar) was added by small spoonful's. About 3-5 minutes after each addition, the pH was measured. Once the pH had been reduced to about 2.5, no further ion exchange resin was added. The sol/ion exchange resin mixture was stirred for 45-60 minutes, after which the ion exchange resin was filtered off.

1202 g of the ion exchanged Filler 2 (lab ion exchanged Nalco TX 15827) was placed in a three-neck round bottom flask equipped with an overhead air stirrer, thermometer and condenser. While stirring at medium speed the solution was heated to 50° C. and 250 g of 1-methoxy-2-propanol was slowly added. This was followed by the addition of concentrated ammonium hydroxide—added by dropper to quickly adjust the pH from ≤2.7 to ≥9.2.

Once pH had been adjusted to 9.2 or greater, a premix was prepared containing 4.0 g Silane 1 (trimethoxyphenylsilane), 4.69 g Silane 4 (isooctyl silane), and 1250 g 1-methoxy-2-propanol. This was poured into the stirred (50° C.) pH adjusted silica solution over 5-10 minutes, then entire mixture was heated at 90-95° C. for 18-20 hours. The resulting solution was 19.0% silica as determined by oven solids and thermogravimetric analysis.

20 nm Phenylsilane/Isooctyl Silane Modified Silica. (20 nm PsIosMS)

Prior to surface modification, the Filler 3 sol having an initial pH between 8-10.5 was placed in a beaker and while stirring at low speed, the rinsed ion exchange resin (Amberlite IR-120(H) ion exchange resin from Alfa Aesar) was added by small spoonful's. About 3-5 minutes after each addition, the pH was measured. Once the pH had been reduced to about 2.5, no further ion exchange resin was added. The sol/ion exchange resin mixture was stirred for 45-60 minutes, after which the ion exchange resin was filtered off.

750 g of ion exchanged Filler 3 was placed in a three-neck round bottom flask equipped with an overhead air stirrer, thermometer and condenser. While stirring at medium speed the solution was heated to 50° C. and 170 g of 1-methoxy-2-propanol was slowly added. This was followed by the addition of concentrated ammonium hydroxide-added by dropper to quickly adjust the pH from ≤2.7 to ≥9.2. Used a pH probe in the solution to monitor the pH change as the ammonium hydroxide was added.

Once pH had been adjusted to 9.2 or greater, a premix was prepared containing 16.4 g Silane 1 (trimethoxyphenylsilane), 19.32 g Silane 4 (isooctyl silane), and 680 g 1-methoxy-2-propanol. This solution was poured into the stirred (50° C.) pH adjusted silica solution over 5-10 minutes, then entire mixture was heated at 90-95° C. for 18-20 hours. The resulting solution was 11.1% silica as determined by oven solids and thermogravimetric analysis.

90 nm Phenylsilane/Isooctyl Silane Modified Silica. (90 nm PsIosMS)

250 g ion exchanged 90 nm silica was placed in a three-neck round bottom flask equipped with an overhead air stirrer, thermometer, thermowatch and condenser. While stirring and heating at 50° C., 70 g 1-methoxy-2-propanol was added slowly-followed quickly by enough concentrated ammonium hydroxide by dropper to bring to pH from around 2.5 to around 9.5. A premix of 280 g of 1-methoxy-2-propanol, 1.47 g trimethoxyphenylsilane and 0.58 g isooctyltrimethoxysilane was added slowly over 5-10 minutes, then entire mixture was heated at 90-95° C. for 18-20 hours. The resulting solution was 13.37% silica as determined by oven solids and thermogravimetric analysis.

Purification of Epoxy Resins

If required, epoxy resins were purified to reduce/remove contaminants according to the process described in U.S. Pat. No. 6,620,907, herein incorporated by reference.

Sample Preparation

Preparation of Comparative Example 1 Adhesive Composition (C1)

47.5 g Epoxy 1A (ERL 4221e), 337 g 90 nm PsMS (20.7% solids in methoxypropanol/water) and 52.9 g 20 nm PsMS-1 (14.7% solids in methoxypropanol/water) were placed in a bottle, and shaken well until thoroughly mixed. The mixture was then placed on a roto-evaporator with the oil bath set at about 90° C. and vacuum applied. After an hour, the temperature was increased to 150° C. for 45 minute, and methoxypropanol and water were removed. The resulting epoxy/silica had 62.1% silica as determined by thermogravimetric analysis.

1.67 grams of 1,5-pentanediol was added to 25 g of the epoxy/silica mixture from above. The mixture was speed mixed for 60 seconds at 2500 rpms. This gave an 85/15 by weight mix of the epoxy/diol resins with 58% silica. Two identical 26.67 g batches of this epoxy/diol/silica mix were prepared.

To the first 26.67 g batch of the epoxy/diol/silica mixture, was added 1.8 g of a 19.1% solution of CXC 1612 in propylene carbonate. To the second 26.67 g batch of the epoxy/diol/silica mix was added 0.64 g of a 54.1% solution of CXC 1612 in propylene carbonate. Both were speed mixed on a FlackTek 150FVZ speed mixer available from (FlackTek Inc., Landrum, S.C.) for 30 seconds at 2500 rpm.

To minimize the amount of propylene carbonate present in the final material, 16.18 g of the first batch epoxy/diol/silica/initiator mixture was combined with 25.62 g of the second batch epoxy/diol/silica/initiator mixture using a FlackTek 150FVZ speed mixer for 30 seconds at 2500 rpm. Resulting formulation contained 41.8 g of the epoxy/diol/silica/initiator mixture (3% catalyst based on the resin only). Silica solids calculated at 56±1%.

Preparation of Example 1 Adhesive Composition (Ex. 1)

1.67 g 1,5-pentanediol, 0.403 g of a 58.3% bis(4-tert-butylphenyl) iodonium hexafluoroantimonate solution in propylene carbonate, 0.028 g camphorquinone and 0.028 g anthracene were added to 25 g of the epoxy/silica mixture from comparative example C1 above. The mixture was speed mixed for 60 seconds at 2500 rpm using a FlackTek 150 FVZ speed mixer.

Preparation of Example 2 Adhesive Composition (Ex. 2)

33.2 g Epoxy 1A, 5.9 g 1.5 pentanediol, 300 g 90 nm PsCaEMS (21.5% solids in methoxypropanol/water) and 48.7 g 20 nm PsMS (14.7% solids in methoxypropanol/water) were placed in a bottle, and shaken well until thoroughly mixed. The mixture was then placed on a roto-evaporator with the oil bath set at about 90° C. and vacuum applied. After 1-2 hours, the temperature was increased to 125° C. for 15 minute, followed by 145° C. for 15 minutes to ensure the methoxypropanol and water were removed. The resulting epoxy/silica had 63.9% silica as determined by thermogravimetric analysis.

1.22 g 85/15 epoxy 1A/diol 1 mixture, 0.582 g of a 54.9% bis(4-tert-butylphenyl)iodonium hexafluoroantimonate solution in propylene carbonate, 0.0387 g camphorquinone and 0.03979 g anthracene were added to 40 g of the epoxy/silica mixture from above. The mixture was speed mixed for 60 seconds at 2500 rpm. This gave an 85/15 by weight mix of the epoxy/diol resins with estimated silica solids of 61±1.0%.

Preparation of Example 3 Adhesive Composition (Ex. 3)

33.2 g Epoxy 1A, 5.9 g diol 1, 307 g 90 nm PsPrsMS (21.0% solids in methoxypropanol/water) and 48.7 g 20 nm PsMS-1 (14.7% solids in methoxypropanol/water) were placed in a bottle, and shaken well until thoroughly mixed. The mixture was then placed on a roto-evaporator with the oil bath set at about 90° C. and vacuum applied. After 1-2 hours, the temperature was increased to 125° C. for 45 minutes, followed by 145° C. for 15 minutes to ensure the methoxypropanol and water were removed. The resulting epoxy/silica had 63.7% silica as determined by thermogravimetric analysis.

0.542 g of a 54.9% solution of bis(4-tert-butylphenyl) iodonium hexafluoroantimonate in propylene carbonate, 0.0355 g camphorquinone and 0.0357 g anthracene was added to 40 g of the epoxy/silica mixture from above. The mixture was speed mixed for 15 seconds at 3000 rpm. This gave an 85/15 by weight mix of the epoxy/diol resins with estimated silica solids of 62±1%.

Preparation of Example 4 Adhesive Composition
(Ex. 4)

23.8 g Epoxy 3, 351.9 g 140 nm PsIosMS (19.0% solids in methoxypropanol/water), 50 grams of butyl acetate and 66.92 g 20 nm (20 nm PsIosMS-1) (11.1% solids in methoxypropanol/water) were placed in a bottle, shaken well until thoroughly mixed. The mixture was then placed on a roto-evaporator with the oil bath set at about 85-90° C. and vacuum applied. After roughly 2 hours, the temperature was increased to 135° C. for 45 minutes. To make sure all the butyl acetate was removed, the material was then placed in an open container which went into a vacuum oven set at 85° C. and a vacuum pump vacuum was applied for 16 hours. The resulting epoxy/silica mixture was at 75.4% silica as determined by thermogravimetric analysis.

4.13 g of Diol 2, 4.68 g of Epoxy 2 were added to 76 g of epoxy silica mixture and speed mixed for 60 seconds at 2500 rpm. Calculated silica solids were 67.4%.

0.679 g of a solution of 51.4% bis(4-tert-butylphenyl)iodonium hexafluoroantimonate to in propylene carbonate, 0.0334 g camphorquinone and 0.0343 g anthracene were added to 52.8 g of the 67.4% solids epoxy/diol/silica mixture. The mixture was speed mixed for 60 seconds at 2500 rpm. This gave an 85/15 by weight mix of the epoxy/diol resins with calculated silica solids of 66±1%.

Preparation of Example 5 Adhesive Composition
(Ex. 5)

45.5 g Epoxy 1A, 278 g 140 nm PsMS modified silica (24.4% solids in methoxypropanol/water) and 51.4 g 20 nm PsMS-1 (14.65% solids in methoxypropanol/water) were placed in a bottle, shaken well until thoroughly mixed. The mixture was placed on a roto-evaporator with the oil bath set at about 90° C. and vacuum applied. After 1-2 hours, the temperature was increased to 145° C. and material stripped for an additional 60 minutes. After cooling, the material was placed in an 80° C. vacuum oven and vacuum stripped overnight. The epoxy/silica mixture has a 62.5% solids determined by thermogravimetric analysis.

2.95 g of Diol 1, 0.77 g of a solution of 51.4% Bis(4-tert-butylphenyl)iodonium hexafluoroantimonate in propylene carbonate, 0.04 g camphorquinone and 0.0393 g anthracene were added to 44.53 g of epoxy/silica mixture above. The mixture was speed mixed for 60 seconds at 2500 rpm. This gave an 85/15 by weight mix of the epoxy/diol resins with calculated silica solids of 58±1.

Curing of Comparative Examples of C2-C9

Comparative examples C2-C9 were cured per the manufacture's recommended procedures.

Preparation of Example 6 Adhesive Composition
(Ex. 6)

55.25 g Epoxy 1A (ERL 4221e), 9.75 g of 1,5-pentanediol, 87.75 g silica solids equivalents of 90 nm PSMS and 9.75 g silica solids equivalents of 20 nm PSMS silica sol were placed in a bottle, and shaken well until thoroughly mixed. The mixture was then placed on a roto-evaporator with the oil bath set at 85-90° C. and vacuum applied. Once most the volatiles had been removed (roughly one hour) the temperature was increased to 150° C. for 45 minutes as a final devolatilizing step. The resulting epoxy/silica had 59.2% silica as determined by thermogravimetric analysis.

To 125 g of the epoxy/diol/silica mixture from above was added 2.14 g of a 48.8% bis(4-tert-butylphenyl)iodonium hexafluoroantimonate in propylene carbonate solution, 0.102 g of 9,10-diethoxyanthracene and 0.102 g of camphorquinone. Mixture was speed mixed on a FlackTek 150FVZ speed mixer available from (FlackTek Inc., Landrum, S.C.) for 30 seconds at 2500 rpm.

Preparation of Example 7 Adhesive Composition
(Ex. 7)

31.45 g Epoxy 1B (Celloxide 2021P from Daicel), 5.55 g of 1,5-pentanediol, 63.0 g silica solids equivalents of 90 nm PSMS were placed in a bottle, and shaken well until thoroughly mixed. The mixture was then placed on a roto-evaporator with the oil bath set at 85-85° C. and vacuum applied. Once most the volatiles had been removed (1.5-2 hours) the temperature was increased to 150° C. for 45 minutes as a final devolatilizing step. The resulting epoxy/silica had 62.85% silica as determined by thermogravimetric analysis.

To 40 g of the Epoxy 1B/diol/silica mixture from above was added 0.598 grams of a 50.5% by weight, 4 bis(4-tert-butylphenyl)iodonium hexafluoroantimonate in propylene carbonate solution, 0.0296 g of 9,10-diethoxyanthracene and 0.0292 g of camphorquinone. The mixture was speed mixed on a FlackTek 150FVZ speed mixer available from (FlackTek Inc., Landrum, S.C.) for 30 seconds at 2500 rpm.

Preparation of Example 8 Adhesive Composition
(Ex. 8)

31.45 g Epoxy 1B Daicel Celloxide 2021P), 5.55 g 1,5-pentanediol, 63.0 g silica solids equivalents of 90 nm PsIosMS were placed in a bottle, and shaken well until thoroughly mixed. The mixture was then placed on a roto-evaporator with the oil bath set at 85-85° C. and vacuum applied. Once most the volatiles had been removed (1.5-2 hours) the temperature was increased to 150° C. for 45 minutes as a final devolatilizing step. The resulting epoxy/silica had 62.8% silica as determined by thermogravimetric analysis.

40 grams of the Epoxy 1B/diol/silica mixture from above was combined with 0.626 g of a 48.5% by weight, 4-Octyloxydiphenliodonium hexafluoroantimonate in propylene carbonate solution, 0.03 g 9,10-diethoxyanthracene and 0.03 g camphorquinone. Mixture was speed mixed on a FlackTek 150FVZ speed mixer available from (FlackTek Inc., Landrum, S.C.) for 30 seconds at 2500 rpm.

Preparation of Example 9 Adhesive Composition
(Ex. 9)

31.45 g Epoxy 1B (Daicel Celloxide 2021P), 5.55 g of 1,5-pentanediol, 56.7 g silica solids equivalents of 90 nm PsIosMS, 6.3 g silica solids equivalents of 20 nm PsIosMS were placed in a bottle, and shaken well until thoroughly mixed. The mixture was then placed on a roto-evaporator with the oil bath set at 85-85° C. and vacuum applied. Once most the volatiles had been removed (1.5-2 hours) the temperature was increased to 150° C. for 45 minutes as a final devolatilizing step. The resulting epoxy/silica had 62.6% silica as determined by thermogravimetric analysis.

40 g of the Epoxy 1B/diol/silica mixture from above was combined with 0.629 g 48.5% by weight, 4-Octyloxydiphenliodonium hexafluoroantimonate in propylene carbonate solution, 0.03 g 9,10-diethoxyanthracene and 0.03 g camphorquinone. Mixture was speed mixed on a FlackTek 150FVZ speed mixer available from (FlackTek Inc., Landrum, S.C.) for 30 seconds at 2500 rpm.

return loss were monitored as the temperature was cycled according to the Telcordia GR-326 standard from −40° C. to 75° C.

The results show that the insertion loss was stable at 0.08 dB and return loss was stable at 36 dB within a 2 dB range. Improving the matching of the index of refraction between the sample adhesive and the glass core of the optical fiber will improve the return loss of the optical fiber splice.

TABLE 1

Properties of exemplary epoxy adhesive compositions

| | C1 | Ex. 1 | Ex. 2 | Ex. 3 | Ex. 4 | Ex. 5 |
|---|---|---|---|---|---|---|
| Uncured adhesive formulation | | | | | | |
| Refractive Index | | | | | | |
| 589 nm | | 1.4782 | 1.4771 | 1.4758 | 1.4661 | 1.4675 |
| 1550 nm | | 1.4752 | | | | |
| Cured adhesive formulation | | | | | | |
| Tg | 54° C. | 54° C. | 54° C. | | | |
| Refractive Index at 1550 nm | 1.4657 | 1.4620 | 1.4664 | 1.4616 | 1.4572 | 1.4675 |
| dn/dT (×10$^{-5}$) | −9.15 | −4.42 | −8.50 | −7.50 | −16.4 | −17.5 |
| Hardness | | | | | | |
| 30 sec. cure | | 868 MPa | 134 MPa | 8.46 MPa | | |
| 60 sec. cure | | 666 MPa | 155 MPa | 9.35 MPa | | |
| Young's modulus | | | | | | |
| 30 sec. cure | | 19.0 GPa | 7.47 GPa | 5.54 GPa | | |
| 60 sec. cure | | 14.7 GPa | 7.83 GPa | 9.35 GPa | | |
| Pull-out Strength | | | | | | |
| 2 mm Cleave | | 2.269 lbf | 1.558 lbf | 0.814 lbf | | |
| 5 mm Cleave | | 3.012 lbf | 1.063 lbf | 0.938 lbf | | |
| 10 mm Cleave | | 3.744 lbf | 1.775 lbf | 1.575 lbf | | |

TABLE 2

Properties of commercially available materials

| | C2 OC-431a | C3 bulk | C4 Ultra | C5 | C6 | C7 | C8 | C8 |
|---|---|---|---|---|---|---|---|---|
| Chemistry | not available | EP | EP | UA | UA | UA | UA | UA |
| Cure Type | None | Blue | Blue | UV | UV/Violet | UV/Violet | UV | UV/Violet |
| Tg | | 54° C. | 56° C. | | | | | |
| Refractive Index | | | | | | | | |
| 589 nm | 1.4625 | | | 1.4450 | 1.4453 | 1.4388 | 1.4255 | 1.4783 |
| 1550 nm | 1.4519 | 1.4896 | 1.4896 | 1.4623 | 1.4607 | 1.4623 | 1.4697 | 1.4582 |
| dn/dT (×10$^{-5}$) | −35.0 | −11.1 | −11.1 | −23.0 | −17.9 | −21.9 | −24.2 | −21.3 |

EP—Epoxy
UA—Urethane Acrylate

Splice Reliability and Optical Performance

Two flat cleaved optical fibers were joined together between silica substrate with ground v-grooves to utilizing the adhesive of Example 1 which was cured through one side of the splice element with a 60 second exposure from a Paradigm DeepCure LED curing light, followed by a 60 second exposure from the top. The test samples were put into a controlled temperature chamber and the insertion loss and Effects of Curing Method Three different methods were used to cure the compositions of examples 6-9 involving the use of a blue light curing wand or an LED array.

Blue Light Wand Cure Method (BL$_W$)

An adhesive sample was cured on a clean lab glass slide with a paradigm DeepCure LED curing light at 450 nm for a prescribed amount of time. This LED light source has a fixed device output intensity of about 1470 mW/cm². The samples were transferred to DSC pans for evaluation of Tg. Cure conditions and the Tg of the cured adhesive are shown in Table 4.

Blue Light Wand Cure with Additional Thermal Curing Step ($BL_W+\Delta$)

An adhesive sample was exposed on a glass slide with a paradigm DeepCure LED curing light at 450 nm for a prescribed amount of time. This light source has a fixed device output intensity of about 1470 mW/cm². A small section of the exposed sample was transferred to a DSC pan, which was sealed and then placed in the DSC cell that had been preheated to the prescribed temperature and held for a prescribed amount of time. The DSC pan containing the heat-treated sample was removed, and cooled. The Tg was then determined as prescribed above. Results are shown in Table 4.

Led Array Cure Method ($BL_A$)

An adhesive sample was cured on either a polymer substrate (VECTRA® A130 LCP Glass Reinforced available from Ticona Engineering Polymers (Florence, Ky.) or a clean lab glass slide using an LED array at a prescribed set of conditions. Current ranges explored were 0.75 A to 3.0 A and corresponded to intensities of 500 mW/cm² to 2000 mW/cm². Current setting for each cured sample is included in the corresponding results tables. The LEDs used in the array were Luxeon LXZ2-PR02 ($\lambda$=450+/−15 nm)-200 LEDs×150 mA that are capable of producing approximately 100 Watts of power. The LEDs were arranged in a 10×20 two-dimensional array with a 2.5 mm spacing. A finned anodized aluminum heat sink has been used, sized appropriately to dissipate the heat generated by the array used to cure our adhesives. The samples were then removed to DSC pans for evaluation of Tg. Results are shown in Tables 3 and 4.

TABLE 3

The effect of current on the curing of select adhesive materials using an LED array with a 30 second exposure time

| Substrate Current | Ex. 6 Glass Tg (° C.) | Ex. 6 Glass Residual Cure (J/g) | Ex. 7 Polymer Tg (° C.) | Ex. 7 Polymer Residual Cure (J/g) | Ex. 8 Polymer Tg (° C.) | Ex. 8 Polymer Residual Cure (J/g) |
|---|---|---|---|---|---|---|
| 0.75 | 59 | 8 | 49 | 27 | 53 | 39 |
| 1.00 | 58 | 4 | 59 | 23 | 62 | 21 |
| 1.25 | 60 | 4 | 56/103 | 12 | 54/125 | 9 |
| 1.50 | 84 | — | 58 | 14 | 64/120 | 14 |
| 1.75 | 91 | — | 100 | 4.5 | 51/123 | 7 |
| 2.00 | 84 | — | 118 | — | 131 | — |
| 2.25 | 48/97 | — | 119 | — | 123 | — |
| 2.50 | | | 115 | — | 125 | — |
| 2.75 | | | 118 | 3 | 120 | — |
| 3.00 | | | 90 | 3 | 47/126 | — |

For the examples shown in Table 3, the preferred current settings are between 1.5 A to 3.0 A, preferably between to 2.0 A and 2.75 A, based on Tg and completeness of cure (residual cure less than 10 J/g, preferably 5 J/g, most preferable about 0 J/g).

UV Cure Process for Comparative Example C10

A 535-AN adhesive sample was cured on a clean lab glass slide with using an EFOS UltraCure 100SS plus Curing System ($\lambda$=320 nm-500 nm) having an output intensity of 630 mW/cm² to 900 mW/cm². The samples were then removed to DSC pans for evaluation of Tg. Results are shown in Table 4.

TABLE 4

Comparison of curing methods

| | C10 | Ex. 6 | Ex. 6 | Ex. 6 | Ex. 7 | Ex. 7 | Ex. 7 | Ex. 8 | Ex. 8 | Ex. 8 | Ex. 9 | Ex. 9 |
|---|---|---|---|---|---|---|---|---|---|---|---|---|
| Uncured Adhesive Refractive Index at 23° C. | | | | | | | | | | | | |
| 589 nm | | | 1.4780 | | | 1.4771 | | | 1.4780 | | | |
| Cure Details | | | | | | | | | | | | |
| Cure method | UV + $\Delta$** | $BL_W$ | $BL_W + \Delta^{++}$ | $BL_A$ | $BL_W$ | $BL_W + \Delta^{++}$ | $BL_A$ | $BL_W$ | $BL_W + \Delta^{++}$ | $BL_A$ | $BL_W$ | $BL_W + \Delta^{++}$ |
| Current setting | | | | 1.75 | | | 2.00 | | | 2.00 | | |
| Thermal cure temperature | 90° C. | | 110° C. | | | 110° C. | | | 110° C. | | | 110° C. |
| Thermal cure time (min) | 30 | | 5 | | | 5 | | | 5 | | | 5 |
| Optical Properties | | | | | | | | | | | | |
| Refractive Index | | | | | | | | | | | | |
| 589 nm | | | 1.4780 | | | 1.4771 | | | 1.4776 | | | |
| 1550 nm | | | 1.4636 | | | 1.4638 | | | 1.4621 | | | |
| dn/dT (×10⁻⁵) | | | −6.10 | | | −5.10 | | | −4.80 | | | |
| Tg (° C.) after prescribed exposure | | | | | | | | | | | | |
| 15 s | | | 90 | | | 121 | | | 130 | | | |
| 30 s | | 44.5 | 89 | 91 | 51.3 | 130 | 118 | 44 | 130 | 131 | 48 | 138 |
| 60 s | | 53 | 90 | | | 124 | | 51 | 126 | | 47 | 134 |
| 300 s | 120 | | | | | | | | | | | |
| Residual Cure (J/g) | | | | | | | | | | | | |
| 15 s | | | — | | 5 | | | | — | | | |
| 30 s | | 32 | — | 45 | — | — | | 61 | — | — | 53 | — |

TABLE 4-continued

Comparison of curing methods

| | C10 | Ex. 6 | Ex. 6 | Ex. 6 | Ex. 7 | Ex. 7 | Ex. 7 | Ex. 8 | Ex. 8 | Ex. 8 | Ex. 9 | Ex. 9 |
|---|---|---|---|---|---|---|---|---|---|---|---|---|
| 60 s | | 20 | — | | 0.36 | 49 | — | | 0.47 | — | | |
| 300 s | | | | | | | | | | | | |

TABLE 5

Coefficient of thermal expansion for selected example materials

| | Ex. 6 | Ex. 6 | Ex. 6 | Ex. 7 | Ex. 8 | Ex. 9 |
|---|---|---|---|---|---|---|
| Cure method | $BL_W$ | $BL_W + \Delta^{++}$ | $BL_A$ | $BL_A$ | $BL_A$ | $BL_A$ |
| Exposure time (s) | 30 | 30 | 30 | 30 | 30 | 30 |
| Current setting (A) | | | 2.25 | 2.25 | 2.25 | 2.25 |
| Thermal cure temperature | | 110° C. | | | | |
| Thermal cure time (min) | | 5 | | | | |
| Coefficient of thermal expansion (μm/(m · °C.)) | | | | | | |
| 1st heat cycle | | | | | | |
| 0-40° C. | 29.4 | 27.5 | 31.4 | 32.8 | 33.5 | 31.8 |
| 0-60° C. | | | 34.8 | 35.7 | 34.4 | 31.6 |
| 0-80° C. | | | 34.3 | 34.5 | 34.6 | 32.2 |
| 2nd heat cycle | | | | | | |
| 0-40° C. | 26.3 | 24.9 | 31.8 | 32.8 | 33.9 | 33.3 |
| 0-60° C. | 28.3 | 25.9 | 34.3 | 34.5 | 35.5 | 35.1 |
| 0-80° C. | 30.2 | | 37.3 | 36.5 | 37.7 | 36.8 |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. This disclosure is not intended to be unduly limited by the illustrative embodiments and examples set forth herein and that such examples and embodiments are presented by way of example only with the scope of the disclosure intended to be limited only by the claims set forth herein as follows.

We claim:

1. An adhesive composition for joining optical components, comprising:
   at least one epoxy resin;
   a visible light photoinitiating system comprising at least one of a cationic photoinitiator and a sensitizer;
   a polyol; and
   at least 50 wt. % of a nanoparticle filler comprising a first nanoparticle having a first nominal size and a second nanoparticle having a second size, wherein the first nanoparticle is larger than the second nanoparticle,
   wherein the adhesive has a refractive index between 1.44 and 1.485 at 1550 nm and a dn/dT of less than $-2E-4$ when cured, and wherein the adhesive has an optical transmission of greater than 98%.

2. The adhesive composition for joining optical components of claim 1, wherein the adhesive composition comprises:
   5 wt. %-49.9 wt. % of at least one epoxy resin;
   0.1 wt. %-30 wt. % of a polyol; and wherein the visible light photoinitiating system comprises 1%-3% of a cationic photoinitiator based on the weight of the epoxy resin and the polyol and 0.05%-0.5% of a sensitizer based on the weight of the epoxy resin and the polyol.

3. The adhesive composition of claim 1, wherein the at least one epoxy resin has a refractive index less than 1.5.

4. The adhesive composition of claim 1, wherein the at least one epoxy resin is one of an aliphatic epoxy resin, a cycloaliphatic epoxy resin and an epoxy-functional silicone resin.

5. The adhesive composition of claim 1, wherein the polyol is a short chain diol.

6. The adhesive composition of claim 5, wherein the short chain diol is at least one of 1,2-ethanediol, 1,2-propanediol, 1,3-propanediol, 1,4-butanediol, 1,3-butanediol, 2-methyl-1,3-propanediol, 2,2-dimethyl-1,3-propanediol, 2-ethyl-1,6-hexanediol, 1,5-pentanediol, 1,6-hexanediol, 1,8-octanediol, and neopentyl glycol.

7. The adhesive composition of claim 1, comprising greater than or equal to 60 wt. % of a nanoparticle filler.

8. The adhesive composition of claim 1, comprising greater than 65 wt. % of a nanoparticle filler.

9. The adhesive composition of claim 1, wherein a mass ratio of the first nanoparticle having a first nominal size and a second nanoparticle is between 95/5 and 75/25.

10. The adhesive composition of claim 1, wherein a size of the first nanoparticle having a first nominal size and a second nanoparticle is between 2:1 and 7:1.

11. The adhesive composition of claim 1, wherein a cationic photoinitiator is an onium salt.

12. The adhesive composition of claim 1, wherein a cationic photoinitiator is one of an iodonium salt and a sulfonium salt.

13. The adhesive composition of claim 1, wherein the adhesive composition is blue light curable.

14. The adhesive composition of claim 1, further comprising an electron donor.

15. The adhesive composition of claim 1, further comprising a colorant that changes color to mark the onset of the adhesive cure.

16. The adhesive of claim 1, wherein the adhesive is bonded to an optical fiber such that the optical fiber bonded by the adhesive has a pullout strength of greater than 1.5 $lb_f$.

17. The adhesive of claim 1, wherein the cured adhesive has glass transition temperature that is greater than 50° C.

18. The adhesive of claim 1, wherein the coefficient of thermal expansion is less than about 45 ppm.

19. The adhesive of claim 1, wherein the coefficient of thermal expansion is less than about 35 ppm.

20. The adhesive of claim 1, wherein refractive index is between 1.44 and 1.47 at 1550 nm.

21. The adhesive of claim 1, wherein the nanoparticle filler is nanoparticle silica.

22. The adhesive of claim 1, wherein the cured adhesive has glass transition temperature that is greater than 70° C.

23. The adhesive of claim 1, wherein the cured adhesive has glass transition temperature that is greater than 90° C.

* * * * *

UNITED STATES PATENT AND TRADEMARK OFFICE
CERTIFICATE OF CORRECTION

| | | |
|---|---|---|
| PATENT NO. | : 10,329,460 B2 | Page 1 of 2 |
| APPLICATION NO. | : 15/696901 | |
| DATED | : June 25, 2019 | |
| INVENTOR(S) | : Wendy Thompson | |

It is certified that error appears in the above-identified patent and that said Letters Patent is hereby corrected as shown below:

In the Specification

Column 5
Line 33, Delete "polydimethysiloxane." and insert -- polydimethylsiloxane. --, therefor.

Column 8
Line 16, Delete "phenyltrichlorsilane," and insert -- phenyltrichlorosilane, --, therefor.

Column 9
Line 40, Delete "9-acetylantracene," and insert -- 9-acetylanthracene, --, therefor.
Line 52, Delete "3,4-hexanedionc," and insert -- 3,4-hexanedione, --, therefor.
Line 64, Delete "Fosin" and insert -- Eosin --, therefor.

Column 15
Line 25, Delete "spoonful's" and insert -- spoonfuls --, therefor.

Column 16
Line 37, Delete "spoonful's" and insert -- spoonfuls --, therefor.
Line 67, Delete "spoonful's" and insert -- spoonfuls --, therefor.

Column 19
Line 26, Before "in" delete "to".

Column 20
Line 50-51, Delete "4-Octyloxydiphenliodonium" and insert -- 4-Octyloxydiphenyliodonium --, therefor.

Column 21
Line 4-5, Delete "4-Octyloxydiphenliodonium" and insert -- 4-Octyloxydiphenyliodonium --, therefor.
Column 22

Signed and Sealed this
Twelfth Day of May, 2020

Andrei Iancu
*Director of the United States Patent and Trademark Office*

Line 58, Delete "Effects" and insert -- Effect --, therefor.

Column 23
Line 22, Delete "Led" and insert -- LED --, therefor.